United States Patent
Yamato et al.

(10) Patent No.: US 11,927,928 B2
(45) Date of Patent: Mar. 12, 2024

(54) OUTPUT MANAGEMENT APPARATUS, OUTPUT MANAGEMENT METHOD, AND PROGRAM

(71) Applicant: OMRON Corporation, Kyoto (JP)

(72) Inventors: Tetsuji Yamato, Yokohama (JP); Taiji Yoshikawa, Kizugawa (JP)

(73) Assignee: OMRON CORPORATION, Kyoto (JP)

( * ) Notice: Subject to any disclaimer, the term of this patent is extended or adjusted under 35 U.S.C. 154(b) by 854 days.

(21) Appl. No.: 16/962,681

(22) PCT Filed: Nov. 29, 2018

(86) PCT No.: PCT/JP2018/043931
§ 371 (c)(1),
(2) Date: Jul. 16, 2020

(87) PCT Pub. No.: WO2019/159489
PCT Pub. Date: Aug. 22, 2019

(65) Prior Publication Data
US 2020/0371483 A1    Nov. 26, 2020

(30) Foreign Application Priority Data
Feb. 13, 2018   (JP) .................................. 2018-022800

(51) Int. Cl.
*G05B 17/02*        (2006.01)
*G05B 19/042*       (2006.01)
(Continued)

(52) U.S. Cl.
CPC ......... *G05B 17/02* (2013.01); *G05B 19/0423* (2013.01); *G06F 16/2474* (2019.01);
(Continued)

(58) Field of Classification Search
CPC ................ G05B 17/02; G05B 19/0423; G05B 2219/37537; G06F 16/383; H04Q 9/00
See application file for complete search history.

(56) References Cited

U.S. PATENT DOCUMENTS

| | | | |
|---|---|---|---|
| 9,386,359 B2 * | 7/2016 | Adler | ........................ H04Q 9/00 |
| 2014/0214726 A1 * | 7/2014 | Minato | .................. H04W 4/50 |
| | | | 709/217 |
| 2015/0066931 A1 | 3/2015 | Nagano et al. | |

FOREIGN PATENT DOCUMENTS

| | | |
|---|---|---|
| CN | 104424357 A | 3/2015 |
| EP | P3392775 A1 | 10/2018 |

(Continued)

OTHER PUBLICATIONS

An Office Action ("CNOA") dated Mar. 8, 2023 in counterpart Chinese Application.

(Continued)

*Primary Examiner* — Mischita L Henson
(74) *Attorney, Agent, or Firm* — METROLEX IP LAW GROUP, PLLC

(57) ABSTRACT

An output management device, an output management method, and a program are provided that manage output of input data to a processing module by a device. The processing module is associated with first metadata indicating a condition of the input data. The input data is associated with second metadata indicating an attribute of the input data. The output management apparatus includes a first acquisition unit, a second acquisition unit, and a notification unit. The first acquisition unit is configured to acquire the first metadata. The second acquisition unit is configured to acquire the second metadata. The notification unit is configured to notify the device of whether or not the input data (Continued)

is allowed to be output to the processing module based on the first and second metadata.

17 Claims, 16 Drawing Sheets

(51) Int. Cl.
    *G06F 16/2458* (2019.01)
    *G06F 16/383* (2019.01)
    *H04Q 9/00* (2006.01)

(52) U.S. Cl.
    CPC ............ *G06F 16/383* (2019.01); *H04Q 9/00* (2013.01); *G05B 2219/37537* (2013.01)

(56) References Cited

FOREIGN PATENT DOCUMENTS

| | | | |
|---|---|---|---|
| JP | 2007-122433 A | 5/2007 | |
| JP | 2013-172247 A | 9/2013 | |
| JP | 2014-45242 A | 3/2014 | |
| JP | 2015228612 A * | 12/2015 | ......... G05B 19/0425 |
| JP | 2016-25568 A | 2/2016 | |
| JP | 2018097705 A * | 6/2018 | ............ G06F 16/00 |
| WO | 2015/182416 A1 | 12/2015 | |
| WO | 2017/104287 A1 | 6/2017 | |

OTHER PUBLICATIONS

An English translation of the International Search Report ("ISR") of PCT/JP2018/043931 dated Jan. 15, 2019.
The Written Opinion("WO") of PCT/JP2018/043931 dated Jan. 15, 2019.
The Japanese Office Action dated Jan. 8, 2019 in a counterpart Japanese Patent application.

* cited by examiner

FIG. 4

PREPROCESSING PROGRAM DB

| PROGRAM ID | PREPROCESSING CONTENT | STORAGE LOCATION |
|---|---|---|
| 1 | UNIT CONVERSION (°F→°C) | Z1 |
| 2 | ADJUSTMENT OF NUMBER OF DIGITS (ADJUST TO 5 DIGITS) | Z2 |
| ... | ... | ... |

PROCESSING MODULE-SIDE METADATA DB

| PROCESSING MODULE ID | PORT NUMBER | METADATA ||||||| INPUT DATA CONDITION ||||
|---|---|---|---|---|---|---|---|---|---|---|---|
| | | SENSOR CONDITION ||||| | | | | | |
| | | TYPE | OBSERVATION OBJECT | INSTALLATION LOCATION | ... | UNIT SYSTEM | NUMBER OF DIGITS | NUMBER OF PIECES OF DATA | NUMBER OF PIECES OF DATA/TIME | LACK OF DATA | ... |
| M1 | 1 | TEMPERATURE SENSOR | OUTSIDE TEMPERATURE | P1 | ... | °C | 5 | | 3 | ALLOW | ... |
| | 2 | TEMPERATURE SENSOR | OUTSIDE TEMPERATURE | P2 | ... | °C | 4 | | 3 | NOT ALLOW | ... |
| | 3 | TEMPERATURE SENSOR | OUTSIDE TEMPERATURE | P3 | ... | °C | 4 | | 3 | NOT ALLOW | ... |
| M2 | 1 | CAMERA | STATION TICKET GATE | ANYWHERE | ... | - | - | | 1 | ALLOW | ... |
| | 2 | ILLUMINANCE SENSOR | ILLUMINANCE | ANYWHERE | ... | lx | 10 | | 1 | NOT ALLOW | ... |
| | 3 | TEMPERATURE SENSOR | TEMPERATURE | ANYWHERE | ... | °F | 3 | | 1 | NOT ALLOW | ... |
| ... | ... | ... | ... | ... | ... | ... | ... | | ... | ... | ... |

SENSING DATA-SIDE METADATA

| ID | SENSOR ATTRIBUTE | | | | INPUT DATA ATTRIBUTE | | | |
|---|---|---|---|---|---|---|---|---|
| | TYPE | OBSERVATION OBJECT | INSTALLATION LOCATION | ... | UNIT SYSTEM | NUMBER OF DIGITS | LACK OF DATA | ... |
| X1 | TEMPERATURE SENSOR | OUTSIDE TEMPERATURE | P1 | ... | °C | 5 | NONE | ... |

13

OUTPUT MANAGEMENT APPARATUS, OUTPUT MANAGEMENT METHOD, AND PROGRAM

TECHNICAL FIELD

The present invention relates to an output management apparatus, an output management method, and a program.

RELATED ART

JP 2014-45242A (Patent Document 1) discloses a virtual sensor generation device that generates a virtual sensor. In this virtual sensor generation device, a real sensor that is present in a predetermined area is detected, and a virtual sensor is generated by using the detected real sensor (see Patent Document 1).

RELATED ART DOCUMENTS

Patent Documents

Patent Document 1: JP 2014-45242A

SUMMARY OF THE INVENTION

Problem to be Solved by the Invention

A virtual sensor such as the one disclosed in the aforementioned Patent Document 1 includes, for example, a real sensor (an example of a device) and a processing module. The processing module generates output data that differs from input data by processing sensing data (an example of input data) that is output by the real sensor.

In the processing module, conditions of the input data are predetermined in some cases. In such cases, if data that does not satisfy the predetermined conditions is input to the processing module, there is a possibility that inappropriate processing is performed in the processing module.

The present invention has been made to solve the foregoing problem, and aims to provide an output management apparatus, an output management method, and a program that can reduce the possibility that the processing module performs inappropriate processing.

Means for Solving the Problems

An output management apparatus according to the present invention is configured to manage output of input data to a processing module by a device. The processing module is configured to generate output data that differs from the input data, based on at least one piece of the input data. The processing module is associated with first metadata indicating a condition of the input data. The input data is associated with second metadata indicating an attribute of the input data. The output management apparatus includes a first acquisition unit, a second acquisition unit, and a notification unit. The first acquisition unit is configured to acquire the first metadata. The second acquisition unit is configured to acquire the second metadata. The notification unit is configured to notify the device of whether or not the input data is allowed to be output to the processing module based on the first and second metadata.

In this output management apparatus, the device is notified of whether or not the input data is allowed to be output to the processing module based on the first and second metadata. That is to say, the device is notified of whether or not the input data is allowed to be output with consideration given to the condition of the input data to the processing module and the attribute of the input data that is to be input to the processing module. Accordingly, with this output management apparatus, the device is notified of whether or not the input data is allowed to be output with consideration given to necessary items, and the possibility that data that does not satisfy a predetermined condition is input to the processing module decreases. Thus, the possibility that the processing module performs inappropriate processing can be reduced.

Preferably, the device includes a first transmission unit, a data buffer, and a second transmission unit. The first transmission unit is configured to transmit the second metadata to the output management apparatus. The data buffer is configured to temporarily store input data that is associated with the second metadata transmitted by the first transmission unit. The second transmission unit is configured to transmit the input data stored in the data buffer to the processing module, in accordance with whether or not the input data is allowed to be output to the processing module.

The device transmits the input data stored in the data buffer to the processing module, in accordance with the notification regarding whether or not the input data is allowed to be output that is given by the output management apparatus. Accordingly, with this output management apparatus, the possibility that data that does not satisfy the predetermined condition is input to the processing module decreases, and thus, the possibility that the processing module performs inappropriate processing can be reduced.

Preferably, the input data and the second metadata are associated with each other by assigning respective IDs (identifications) to the input data and the second metadata. The first transmission unit is configured to transmit the ID assigned to the second metadata, together with the second metadata, to the output management apparatus. The notification unit is configured to notify the device of whether or not the input data is allowed to be output to the processing module based on the first and second metadata, together with the ID assigned to the second metadata.

In this output management apparatus, the device is notified of whether or not the input data is allowed to be output to the processing module, together with the ID assigned to the second metadata. Accordingly, with this output management apparatus, the device can be caused to recognize whether or not each piece of input data is allowed to be output by causing the device to reference the ID.

Preferably, the processing module is configured to generate the output data based on a plurality of pieces of input data.

Preferably, the processing module is configured to switch the device to output the input data to the processing module.

Preferably, the device is a sensor. The input data is sensing data generated by the sensor.

Preferably, the processing module is configured to generate the output data based on a plurality of pieces of input data.

Preferably, a virtual sensor is formed by the processing module and the device that outputs the input data to the processing module.

Also, an output management method according to another aspect of the present invention manages output of input data to a processing module by a device. The processing module is configured to generate output data that differs from the input data, based on at least one piece of the input data. The processing module is associated with first metadata indicating a condition of the input data. The input data is associated with second metadata indicating an attribute of the input data. The output management method includes a step of acquiring the first metadata, a step of acquiring the second metadata, and a step of notifying the device of whether or not the input data is allowed to be output to the processing module based on the first and second metadata.

In this output management method, the device is notified of whether or not the input data is allowed to be output to the processing module based on the first and second metadata. That is to say, the device is notified of whether or not the input data is allowed to be output with consideration given to the condition of the input data to the processing module and the attribute of the input data that is to be input to the processing module. Accordingly, with this output management method, the device is notified of whether or not the input data is allowed to be output with consideration given to necessary items, and the possibility that data that does not satisfy a predetermined condition is input to the processing module decreases. Thus, the possibility that the processing module performs inappropriate processing can be reduced.

A program according to another aspect of the present invention causes a computer to perform processing to manage output of input data to a processing module by a device. The processing module is configured to generate output data that differs from the input data, based on at least one piece of the input data. The processing module is associated with first metadata indicating a condition of the input data. The input data is associated with second metadata indicating an attribute of the input data. The program is configured to cause the computer to perform a step of acquiring the first metadata, a step of acquiring the second metadata, and a step of notifying the device of whether or not the input data is allowed to be output to the processing module based on the first and second metadata.

Upon this program being executed by the computer, the device is notified of whether or not the input data is allowed to be output to the processing module based on the first and second metadata. That is to say, the device is notified of whether or not the input data is allowed to be output with consideration given to the condition of the input data to the processing module and the attribute of the input data that is to be input to the processing module. Accordingly, with this program, the device is notified of whether or not the input data is allowed to be output with consideration given to necessary items, and the possibility that data that does not satisfy the predetermined condition is input to the processing module decreases. Thus, the possibility that the processing module performs inappropriate processing can be reduced.

Effects of the Invention

According to the present invention, an output management apparatus, an output management method, and a program can be provided that can reduce the possibility that the processing module performs inappropriate processing.

BRIEF DESCRIPTION OF THE DRAWINGS

FIG. 4 is a diagram showing an example of a preprocessing program DB.

FIG. 6 is a diagram showing an example of a processing module-side metadata DB.

FIG. 8 is a diagram showing an example of a sensing data-side metadata.

EMBODIMENTS OF THE INVENTION

Figure 1:
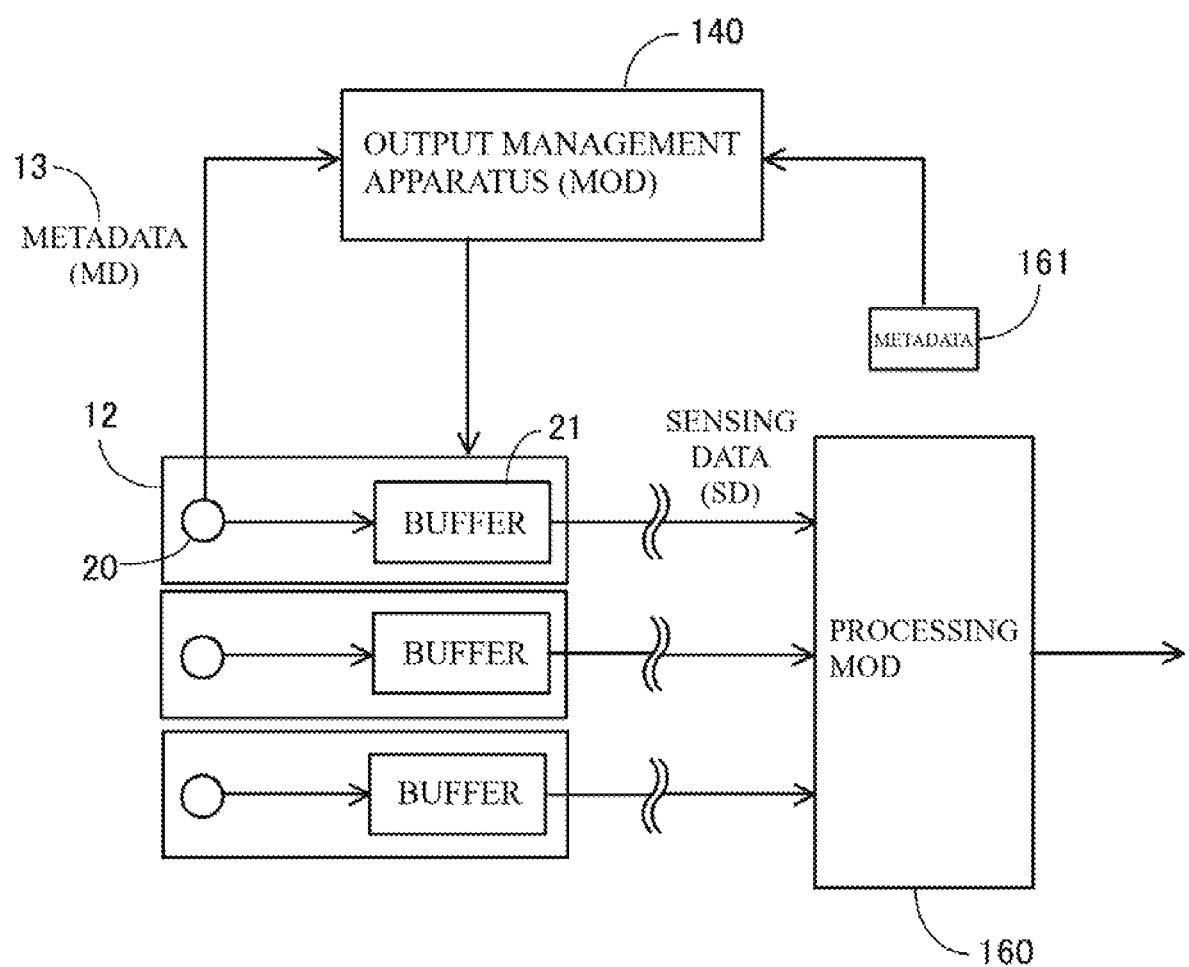
FIG. 1 is a diagram for illustrating an overview of an output management apparatus.

Hereinafter, an embodiment according to an aspect of the present invention (hereinafter also referred to as "the present embodiment") will be described in detail with reference to the drawings. Note that the same or corresponding portions in the diagrams are assigned the same reference numerals, and a description thereof is not repeated. The present embodiment described below is merely an example of the present invention in all respects. Various improvements and modifications can be made to the present embodiment within the scope of the present invention. That is to say, to carry out the present invention, a specific configuration can be employed as appropriately, as per the embodiment.

1. Overview

FIG. 1 is a diagram for illustrating an overview of an output management apparatus (module) 140 according to the present embodiment. Referring to FIG. 1, a processing module 130 has a plurality of input ports, and sensing data (an example of input data) that is output by sensing devices 12 (each of which is an example of a device) is input to the input ports. The processing module 130 is configured to generate output data that differs from the input data, based on the input data. That is to say, a so-called virtual sensor is formed by the processing module 130 and the sensing devices 12 (input sensor) that output input data to the processing module 130. The virtual sensor refers to a sensor module that outputs, as sensing data, the result of observing an object that differs from an object observed by the input sensor, based on the sensing data generated by the input sensor observing the object. The virtual sensor will be described later in detail.

There may be cases where conditions of input data are predetermined in the processing module 130. If, in such cases, data that does not satisfy the predetermined conditions is input to the processing module 130, there is a possibility that inappropriate processing is performed in the processing module 130.

The output management apparatus 140 according the present embodiment is configured to determine whether or not input data is allowed to be output to the processing module 130 by the sensing device 12. Note that, in the sensing devices 12, sensing data is temporarily stored in data buffers 21 until it is determined by the output management module 140 that input data is allowed to be output.

Specifically, the output management apparatus 140 acquires processing module-side metadata (hereinafter also referred to as "first metadata") 161 and sensing data-side metadata (hereinafter also referred to as "second metadata") 13. The first metadata 161 is associated with the processing module 130 and indicates conditions of input data to the processing module 130. The second metadata 13 is associated with sensing data output by the sensing devices 12 and indicates attributes of the sensing data (input data). The output management apparatus 140 determines whether or not input data is allowed to be output to the processing module 130, based on the first metadata 161 and the second metadata 13, and notifies the sensing devices 12 of the determination result.

That is to say, the output management apparatus 140 notifies the sensing devices 12 of the conditions of input data in the processing module 130 and whether or not input data is allowed to be output with consideration given to the attributes of the input data to be input to the processing module 130. Accordingly, with the output management apparatus 140, the sensing devices 12 are notified of whether or not the input data is allowed to be output with consideration given to necessary items, and the possibility that data that does not satisfy the predetermined conditions is input to the processing module 130 decreases. Thus, the possibility that the processing module 130 performs inappropriate processing can be reduced.

2. Configuration 2-1. Configuration of Entire System

Figure 2:
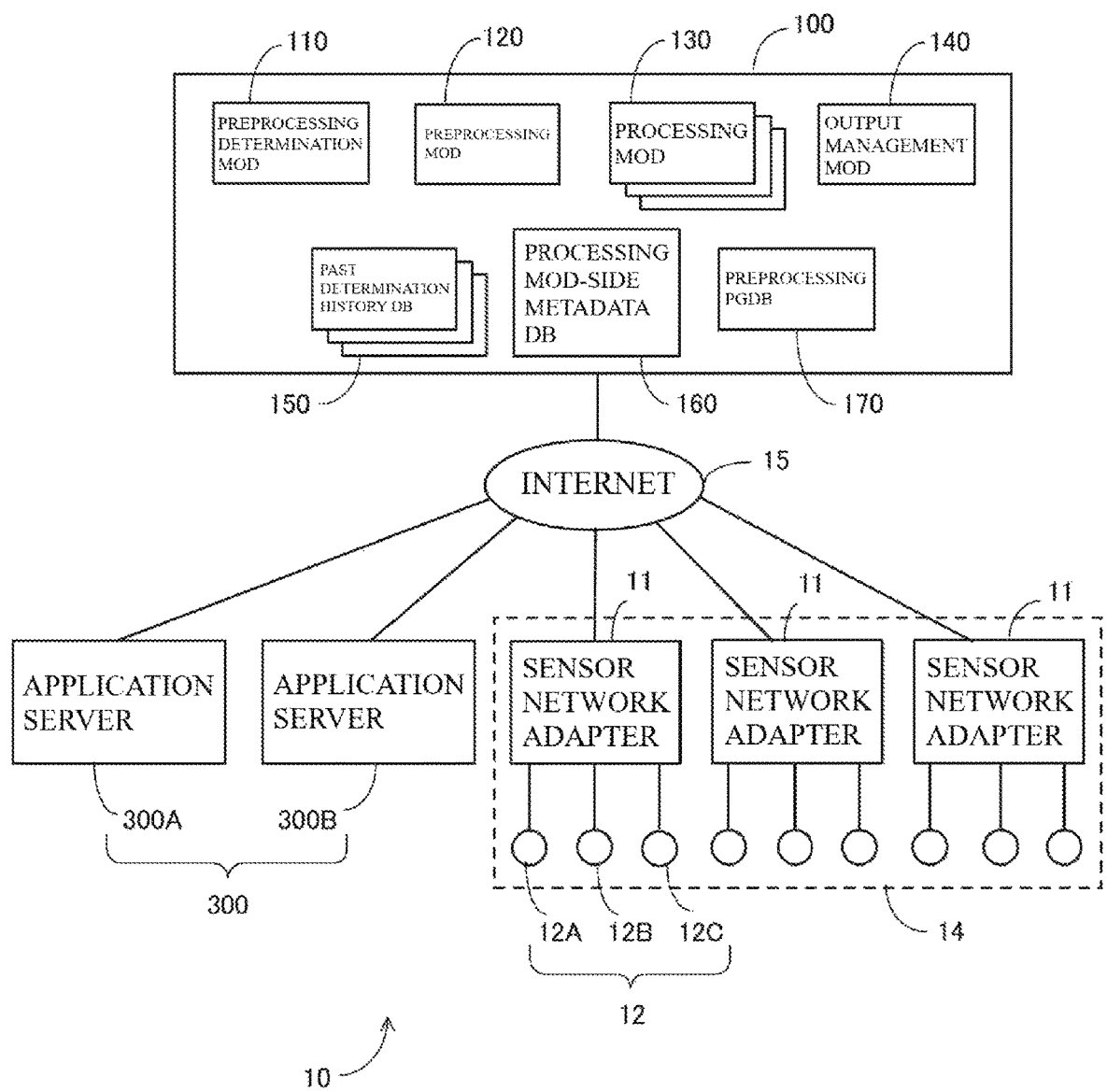
FIG. 2 is a diagram showing an example of a sensor network system.

FIG. 2 is a diagram showing an example of a sensor network system 10 that includes the output management module (apparatus) 140 according to the present embodiment. In the example in FIG. 2, the sensor network system 10 includes a sensor network unit 14, a virtual sensor management server 100, and application servers 300.

The sensor network unit 14, the virtual sensor management server 100, and the application servers 300 are communicatively connected to each other via the Internet 15. Note that the numbers of respective constituent elements (virtual sensor management servers 100, application servers 300, sensor network adapters 11, sensing devices 12 etc.) included in the sensor network system 10 are not limited to those shown in FIG. 2.

In the sensor network system 10, sensing data generated by the sensing devices 12 or the like can be distributed. For example, sensing data generated by the sensing devices 12 may be distributed to the virtual sensor management server 100, and sensing data generated by the virtual sensor may be distributed to the application servers 300.

The sensor network unit 14 includes a plurality of sensor network adapters 11, for example. A plurality of sensing devices 12 are connected to respective sensor network adapters 11, and the sensing devices 12 are connected to the Internet 15 via the sensor network adapters 11.

Each of the sensing devices 12 is configured to obtain sensing data by observing an object. Each of the sensing devices 12 includes, for example, an image sensor (camera), a temperature sensor, a humidity sensor, an illuminance sensor, a force sensor, a sound sensor, an RFID (Radio Frequency IDentification) sensor, an infrared sensor, an orientation sensor, a rainfall sensor, a radioactivity sensor, a gas sensor, or the like. The sensing devices 12 need not necessarily be of a stationary type, and may be of a portable type such as a mobile phone, a smartphone, or a tablet. Each of the sensing devices 12 need not necessarily be constituted by a single sensor, and may be constituted by a plurality of sensors. The sensing devices 12 may be installed for any purpose, and may be, for example, installed for FA (Factory Automation) and production management in a factory, urban traffic control, environmental measurement of the weather or the like, health care, crime prevention, or the like.

In the sensor network unit 14, for example, the sensor network adapters 11 are disposed at separate locations (which are far from each other), and the sensing devices 12 connected to each of the sensor network adapters 11 are disposed at the same (close) location, but the placement locations thereof are not limited thereto.

The application servers 300 (300A, 300B) are configured to execute applications that use sensing data, and are realized by general-purpose computers, for example. The application server 300 acquires necessary sensing data via the Internet 15.

The virtual sensor management server 100 is a server for realizing the virtual sensor. In the virtual sensor management server 100, a plurality of processing modules 130, a preprocessing module 120, a preprocessing determination module 110, and an output management module 140 are realized, and a preprocessing program DB 170, a past determination history DB 150, and a processing module-side metadata DB (hereinafter also referred to as a "first metadata DB) 160 are managed. The plurality of processing modules 130, the preprocessing module 120, the preprocessing determination module 110, and the output management module 140 are software modules, for example.

Each of the processing modules 130 includes at least one input port, and is configured to generate output data that differs from input data, based on the input data that is input to the input port. Each of the processing module 130 can switch the sensing device 12 to output input data to the input port, when necessary. For example, if a sensing device 12 that is currently outputting input data to the input port fails, the processing module 130 can switch the input sensor to another sensing device 12.

Each of the processing modules 130 may also be configured to output data indicating the number of people who are present in a room, based on input data (sound data) that is output by a sound sensor disposed in the room, for example. In this case, a virtual sensor that detects the number of people in the room can be realized by the processing module 130 and the sensing device 12 (sound sensor).

The preprocessing module 120 is configured to perform desired preprocessing on input data to the processing modules 130 due to a corresponding preprocessing program (described later) being executed. The preprocessing determination module 110 is configured to performs determination regarding preprocessing for input data to the processing modules 130. The output management module 140 is configured to manage output of input data from the sensing devices 12 to the processing modules 130. The details of the software modules and the databases will be described later.

2-2. Hardware Configuration of Virtual Sensor Management Server

Figure 3:
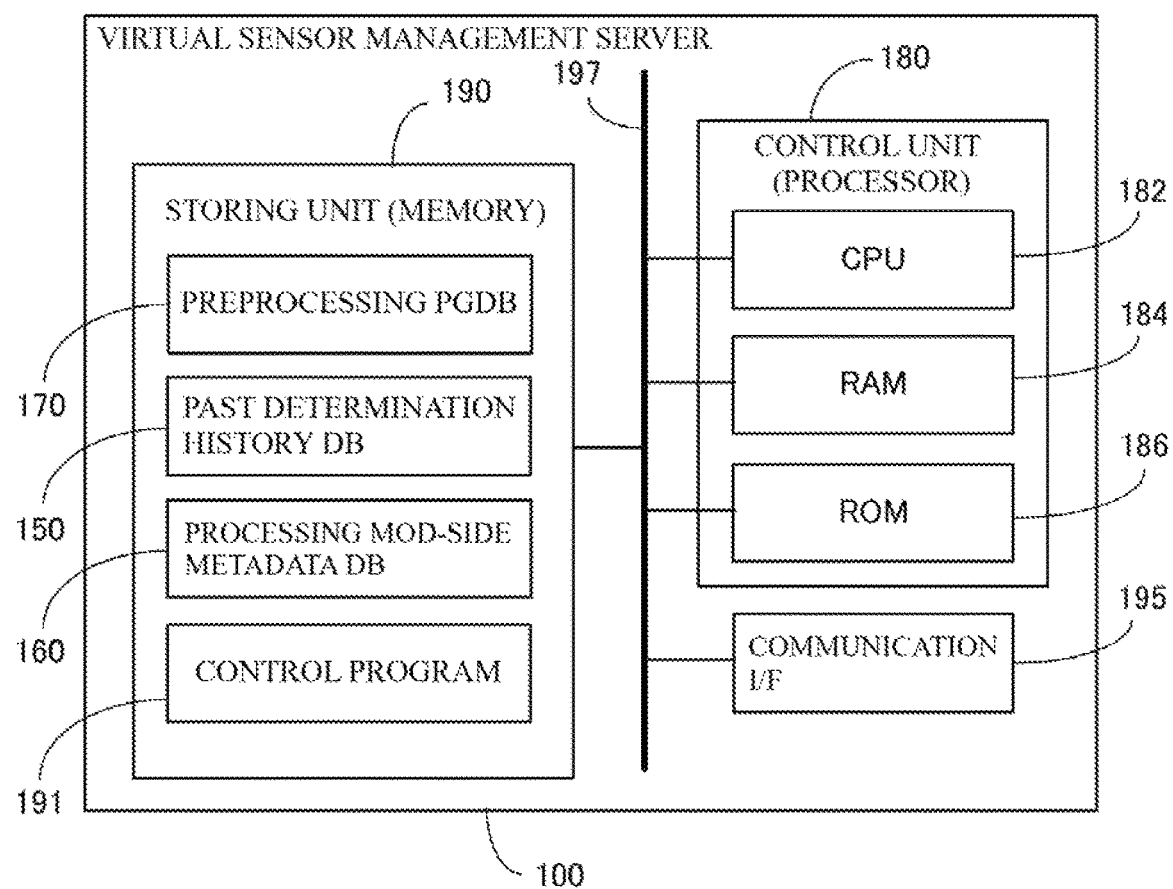
FIG. 3 is a diagram showing an example of a hardware configuration of a virtual sensor management server.

FIG. 3 is a diagram showing an example of a hardware configuration of the virtual sensor management server 100. Note that, in the present embodiment, the virtual sensor management server 100 is realized by a general-purpose computer, for example.

In the example in FIG. 3, the virtual sensor management server 100 includes a control unit 180, a communication I/F (interface) 195, and a storing unit 190, and these constituent elements are electrically connected to each other via a bus 197.

The control unit 180 includes a CPU (Central Processing Unit) 182, a RAM (Random Access Memory) 184, a ROM (Read Only Memory) 186, and so on, and is configured to control the constituent elements in accordance with information processing.

The communication I/F 195 is configured to communicate, via the Internet 15, with external devices (e.g. the application servers 300 and the sensor network unit 14 (FIG. 2)) that are provided outside the virtual sensor management server 100. The communication I/F 195 is constituted by a wired LAN (Local Area Network) module and/or a wireless LAN module, for example.

The storage unit 190 is an auxiliary storage device such as a hard disk drive or a solid-state drive, for example. The storage unit 190 is configured to store the preprocessing program DB 170, the past determination history DB 150, the first metadata DB 160, and a control program 191, for example.

FIG. 4 is a diagram showing an example of the preprocessing program DB 170. The preprocessing program DB 170 is a database for managing a plurality of preprocessing programs. In the example in FIG. 4, "program ID (identification)", "preprocessing content", and "storage location" are managed in association with each other. The "program ID" refers to information with which each preprocessing program can be uniquely specified. The "preprocessing content" refers to the content of preprocessing that is realized due to each preprocessing program being executed. The "storage location" refers to information (e.g. an address on a memory) that enables the location where each preprocessing program is stored to be specified.

For example, in this example, a preprocessing program with the program ID "1" is a program for performing "unit conversion" for input data to the processing modules 130, and is stored at an "address: Z1" on the memory. Note that "unit conversion" is an example of preprocessing, and is processing for converting the unit of input data (e.g. from Fahrenheit to Celsius).

Figure 5:
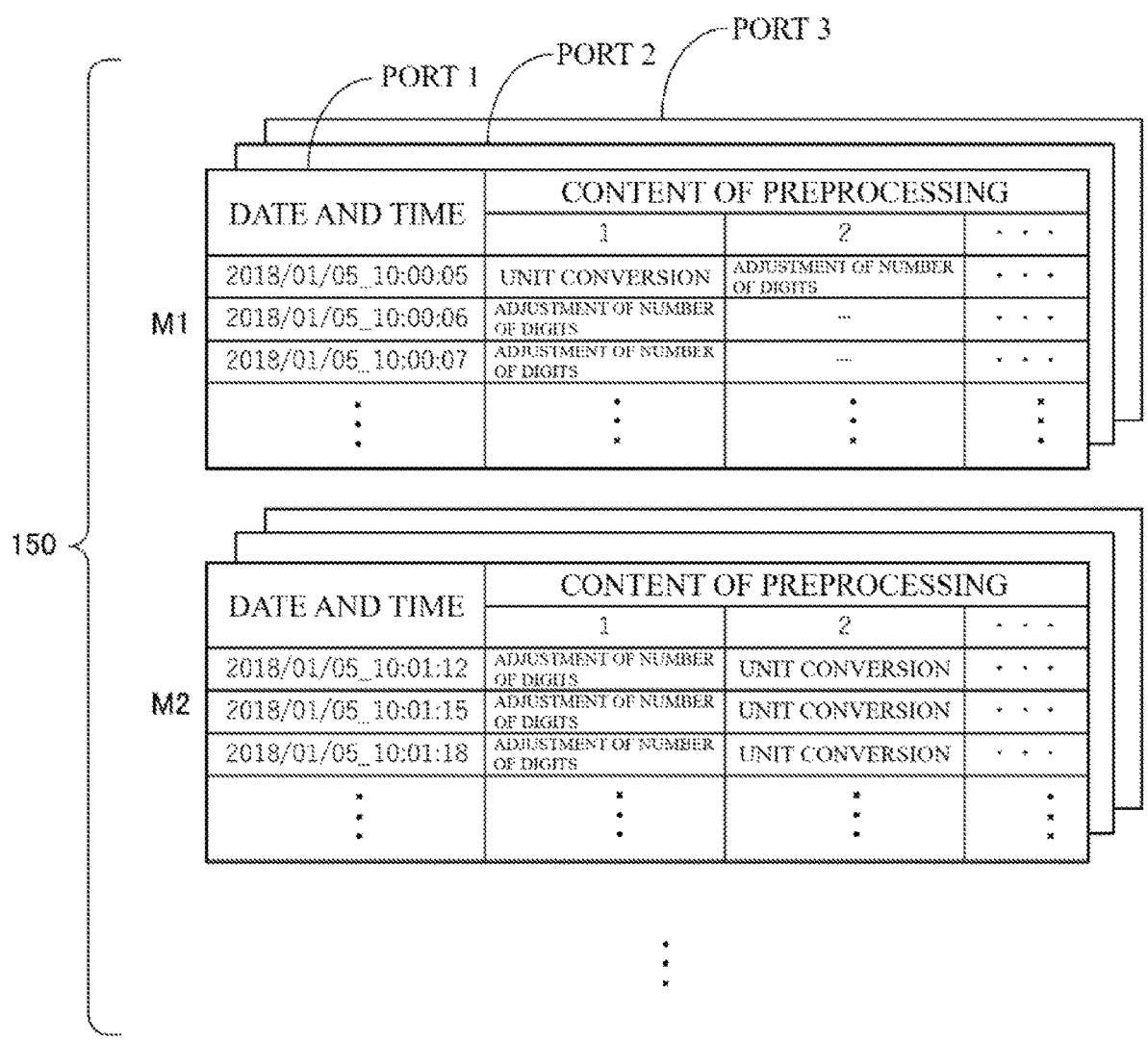
FIG. 5 is a diagram showing an example of a past determination history DB.

FIG. 5 is a diagram showing an example of the past determination history DB 150. The past determination history DB 150 is a database for managing the history of the result of the determination performed by the preprocessing determination module 110. In the example in FIG. 5, in the past determination history DB 150, the history of the result of the determination performed by the preprocessing determination module 110 (FIG. 2) is managed for each of the input ports of the processing modules 130 (ID: M1, M2, . . . ). For example, "time" and "type of preprocessing that was determined as being required" are managed for each of the input ports of the processing modules 130.

For example, in this example, it has been determined that "unit conversion" and "adjustment of the number of digits" need to be performed on input data at a port 1 of the processing module 130 with the ID "M1" at 10:00:05 on Jan. 5, 2018. Note that the "adjustment of the number of digits" is an example of preprocessing. The "adjustment of the number of digits" is processing that is performed, when the number of digits of input data to a processing module 130 is out of a predetermined number of digits, to change the number of digits of the input data so as to be within a predetermined range.

FIG. 6 is a diagram showing an example of the processing module-side metadata (first metadata) DB 160. The first metadata DB 160 is a database for managing the first metadata 161 (FIG. 1), which indicates conditions of input data to the processing modules 130. The first metadata 161 in the processing modules 130 realized in the virtual sensor management server 100 is registered, in advance, in the first metadata DB 160. In the example in FIG. 6, in the first metadata DB 160, the first metadata 161 is managed for each of the input ports of the processing modules 130.

The first metadata 161 includes, for example, "sensor conditions" and "input data conditions". The "sensor conditions" are basic conditions that are required to be satisfied by the sensing devices 12 that output input data (sensing data), and include "type", "observation object", and "installation location", for example.

The "type" refers to the type of each sensing device 12, and for example, a temperature sensor, an illuminance sensor, and a camera are examples of the "type". The "observation object" refers to an object to be observed by each sensing device 12, and for example, outside temperature, a station ticket gate, illuminance, and temperature are examples of the "observation object". The "installation location" refers to the location at which each sensing device 12 is installed, and for example, P1, P2, and P3 are examples of the "installation location" (note that each of P1, P2, and P3 indicates a specific location, such as "Kyoto Station front").

The "input data conditions" refer to conditions related to attributes of input data (sensing data), and include, for example, "system of measurement", "number of digits", "number of pieces of data/time", and "lack of data". The "system of measurement" indicates a condition related to the system of measurement of input data, for example. The "number of digits" indicates a condition related to the number of digits of input data, for example. The "number of pieces of data/time" indicates a condition related to the number of pieces of data required to make input to an input port once, for example. The "lack of data" indicates a condition related to lacking (missing) of input data, for example.

Referring again to FIG. 3, the control program 191 is a control program of the virtual sensor management server 100 executed by the control unit 180. For example, the processing modules 130, the preprocessing module 120, the preprocessing determination module 110, and the output management module 140 may be realized by the control unit 180 executing the control program 191. Also, the control program 191 may include the preprocessing programs. When the control unit 180 executes the control program 191, the control program 191 is loaded to the RAM 174. The control unit 180 controls the constituent elements by the CPU 182 interpreting and executing the control program 191 loaded to the RAM 174.

2-3. Hardware Configuration of Sensing Device

Figure 7:
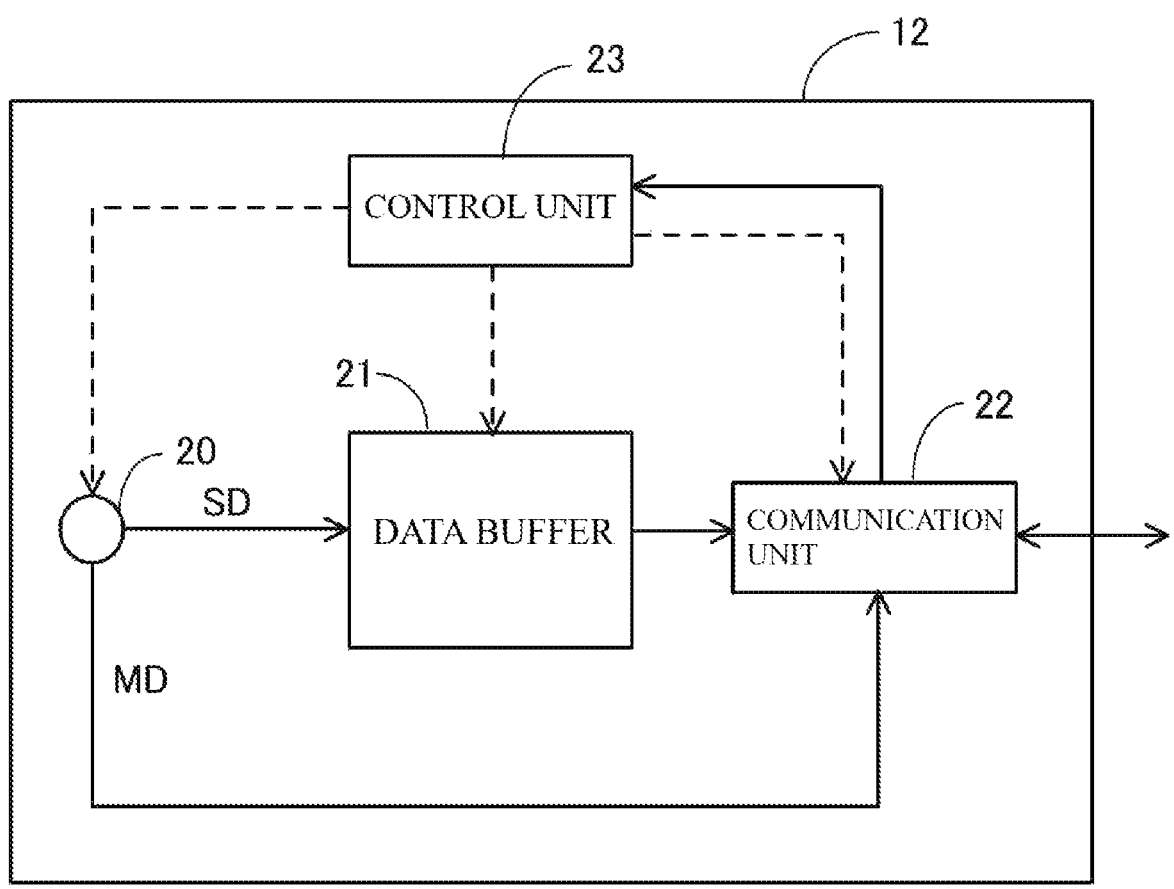
FIG. 7 is a diagram showing an example of a hardware configuration of a sensing device.

FIG. 7 is a diagram showing an example of a hardware configuration of each of the sensing devices 12. In the example in FIG. 7, each of the sensing device 12 includes a real sensor 20, a data buffer 21, a communication unit 22, and a control unit 23.

The real sensor 20 is, for example, an image sensor (camera), a temperature sensor, a humidity sensor, an illuminance sensor, a force sensor, a sound sensor, an RFID sensor, an infrared sensor, an orientation sensor, a rainfall sensor, a radioactivity sensor, a gas sensor, or the like, and may be any kind of sensor. The real sensor 20 is configured to output sensing data, and sensing data-side metadata (second metadata) 13 that is associated with this sensing data.

FIG. 8 is a diagram showing an example of the sensing data-side metadata (second metadata) 13. In the example in FIG. 8, the second metadata 13 includes "sensor attributes" and "input data attributes", for example. The "sensor attributes" indicate attributes of each sensing device 12 that outputs sensing data, and include "type", "observation object", and "installation location", for example. The "input data attributes" indicate attributes of sensing data, and include "system of measurement", "number of digits", and "lack of data", for example.

For example, the real sensor 20 recognizes the "unit of measurement", the "number of digits", and the presence of a "lack of data" by checking generated sensing data, and generates the second metadata 13. Even with the same real sensor 20, errors may occur due to various factors, and the attributes (system of measurement, number of digits etc.) of the generated sensing data may change. Although the details will be described later, for example, if the system of measurement or the number of digits of sensing data is an unexpected one, preprocessing needs to be performed on the sensing data to convert the system of measurement or the number of digits to an expected one.

Note that, since the attributes of sensing data are also affected by the attributes of the sensing devices 12, the "attributes of input data to be input to the processing modules 130" may also include the "sensor attributes".

Referring again to FIG. 7, the data buffer 21 is configured to temporarily store sensing data output by the real sensor 20. The data buffer 21 is constituted by a DRAM (Dynamic Random Access Memory), an SRAM (Static Random Access Memory), or the like, for example.

The communication unit 22 is configured to communicate with external devices (e.g. the application servers 300 and the virtual sensor management server 100) that are provided outside the sensing device 12, via the Internet 15. The communication unit 22 transmits, to the virtual sensor management server 100, the sensing data output by the real sensor 20, and the second metadata 13, for example. Also, the communication unit 22 receives, from the virtual sensor management server 100, information indicating whether or not sensing data is allowed to be transmitted (output) to the virtual sensor management server 100 (hereinafter also referred to as "information regarding whether or not output is allowed"), for example. The information regarding whether or not output is allowed will be described later in detail.

The control unit 23 includes a CPU, a RAM, a ROM, and so on, and is configured to control the constituent elements (e.g. the real sensor 20, the data buffer 21, and the communication unit 22) in accordance with information processing. For example, the control unit 23 controls output of sensing data that is temporarily stored in the data buffer 21, based on the aforementioned information regarding whether or not output is allowed.

2-4. Software Configuration of Virtual Sensor Management Server

Figure 9:
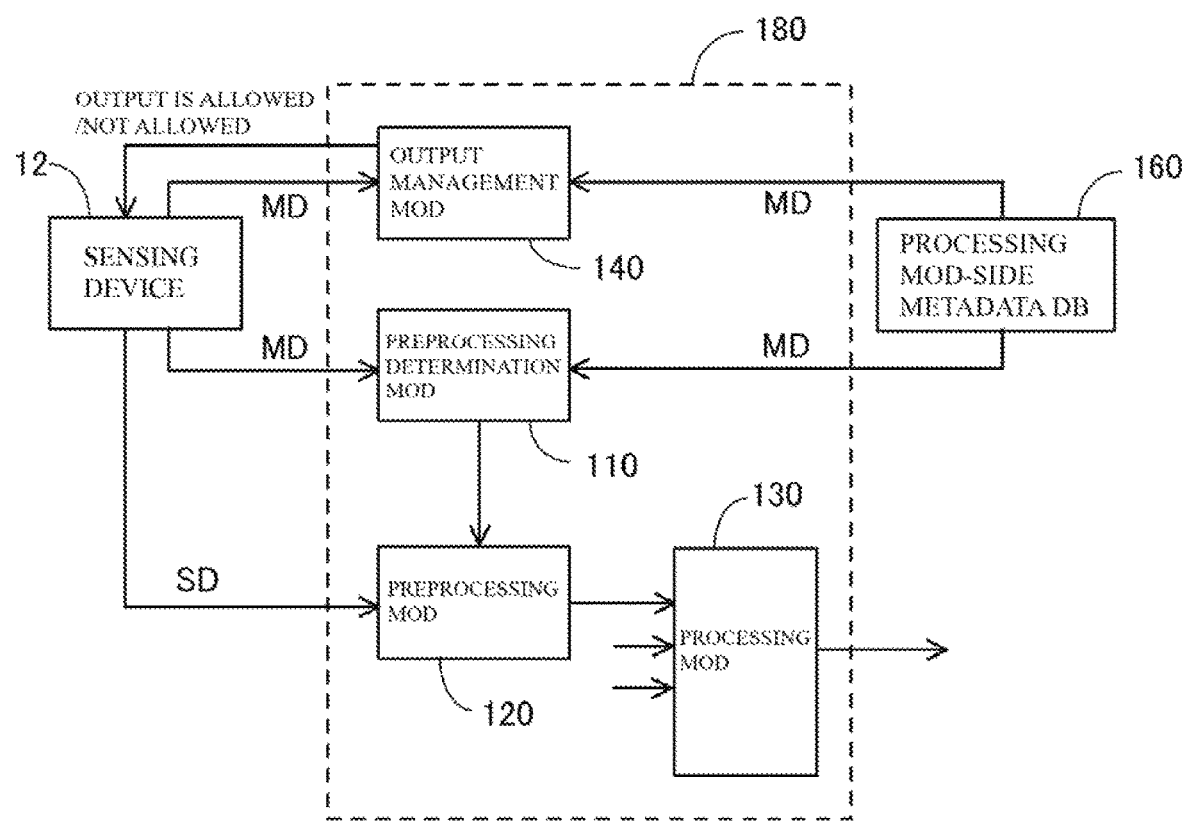
FIG. 9 is a diagram showing an example of the relationship between software modules realized by a control unit.

FIG. 9 is a diagram showing an example of the relationship between the software modules realized by the control unit 180. In the example in FIG. 9, the processing module 130, the preprocessing determination module 110, the output management module 140, and the preprocessing module 120 are realized by the control unit 180.

The preprocessing determination module 110 performs determination regarding preprocessing for sensing data output by the sensing device 12, based on the first metadata 161 acquired from the first metadata DB 160 and the second metadata 13 acquired from the sensing device 12. The preprocessing module 120 is notified of the result of the determination performed by the preprocessing determination module 110.

The output management module 140 determines whether or not sensing data is allowed to be output by a sensing device 12, based on the first metadata 161 and the second metadata 13. The determination result (information regarding whether or not output is allowed) is transmitted to the sensing device 12.

The preprocessing module 120 perform preprocessing on sensing data output by the sensing device 12, in accordance with the result of the determination regarding preprocessing acquired from the preprocessing determination module 110. The preprocessed sensing data is input to the preprocessing module 130. The details of the software modules will be described below in order.

2-4-1. Preprocessing Determination Module

Figure 10:
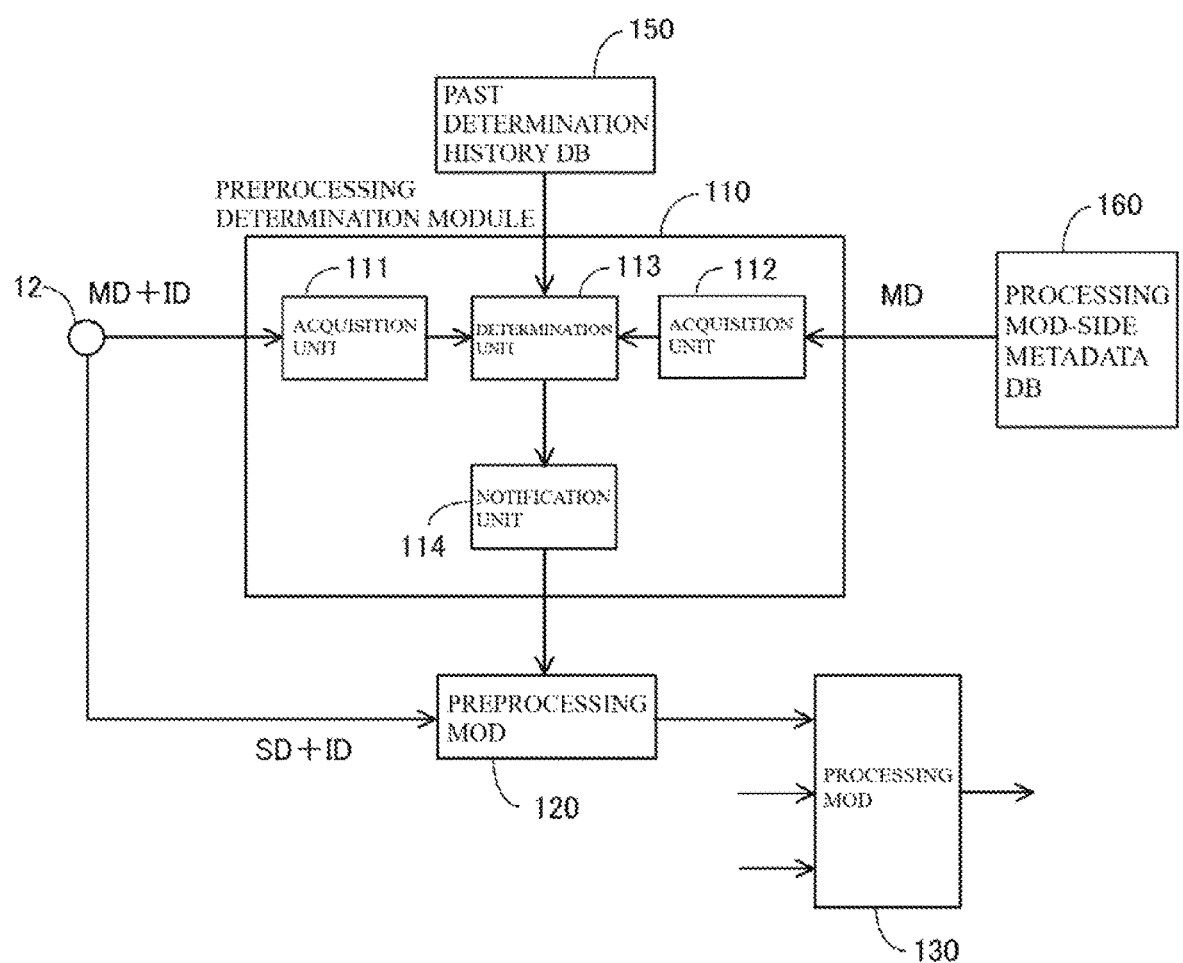
FIG. 10 is a diagram showing an example of a detailed configuration of a preprocessing determination module.

FIG. 10 is a diagram showing an example of a detailed configuration of the preprocessing determination module 110. Note that processing performed by the software modules is performed for each input port of the processing module 130.

Processing corresponding to each input port may be performed in parallel, or may be performed sequentially. In the following description, the modules will be described while paying attention to one input port of the processing module 130.

Referring to FIG. 10, the sensing device 12 outputs the second metadata 13 and the ID assigned to the second metadata 13 to the preprocessing determination module 110, and outputs the sensing data and the ID assigned to the sensing data to the preprocessing module 120. That is to say, the sensing data is not transmitted to the preprocessing determination module 110. Accordingly, in the present embodiment, communication traffic is suppressed compared with the case where both the sensing data and the second metadata 13 are transmitted to the preprocessing determination module 110.

The ID assigned to the second metadata 13 and the ID assigned to the sensing data are related to each other. Accordingly, even if the second metadata 13 and the sensing data are transmitted to different destinations, the second metadata 13 and the sensing data can be associated with each other later by referencing the IDs.

Figure 11:
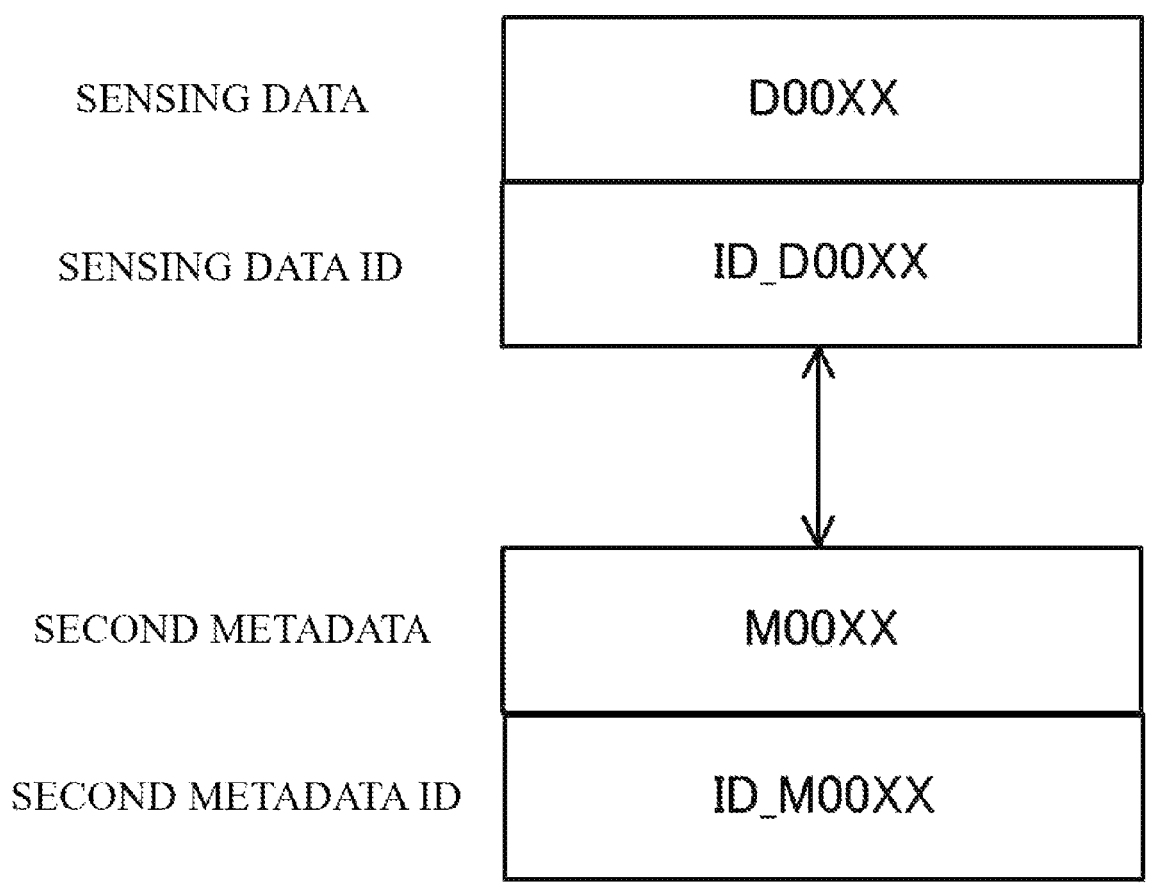
FIG. 11 is a diagram showing an example of IDs assigned to respective pieces of data.

FIG. 11 is a diagram showing an example of IDs assigned to respective pieces of data. In the example in FIG. 11, sensing data is assigned a sensing data ID, and the second metadata 13 corresponding to the sensing data is assigned a second metadata ID. In this example, the last four digits (00XX) of the sensing data ID are the same as the last four digits (00XX) of the second metadata ID. Accordingly, in this example, the second metadata 13 and the sensing data can be associated with each other later by referencing the last four digits of these IDs.

Referring again to FIG. 10, the preprocessing determination module 110 includes acquisition units 111 and 112, a determination unit 113, and a notification unit 114. The acquisition unit 111 acquire the second metadata 13 and the ID assigned to the second metadata 13. The acquisition unit 112 acquires the first metadata 161 (FIG. 1) associated with the input port from the first metadata DB 160.

The determination unit 113 determines whether or not preprocessing needs to be performed on the sensing data, and also determines the content of preprocessing if preprocessing needs to be performed, based on the second metadata 13 acquired by the acquisition unit 111 and the first metadata 161 acquired by the acquisition unit 112.

For example, if the input data attributes indicated by the second metadata 13 satisfy the input data conditions indicated by the first metadata 161, the determination unit 113 determines that preprocessing is not required. On the other hand, if the input data attributes indicated by the second metadata 13 do not satisfy the input data conditions indicated by the first metadata 161, the determination unit 113 determines that preprocessing is required. Furthermore, if it is determined that preprocessing is required, the determination unit 113 determines the content of the required preprocessing, for example, in accordance with the content of the input conditions that the input data attributes do not satisfy. For example, if the "number of digits" in the input data conditions is "3 digits", when the "number of digits" in the input data attributes is "5 digits", the determination unit 113 determines that preprocessing to reduce the number of digits by two digits is required.

Furthermore, the determination unit 113 determines whether or not the preprocessing that is determined as being required is the same as preprocessing that has been performed immediately previously, by referencing the past determination history DB 150. If the required preprocessing is the same as preprocessing that has been performed immediately previously, a necessary preprocessing program has already been read out, and a search in the preprocessing program DB 170 (FIG. 4) need not be performed again. Thus, a more appropriate determination can be made regarding preprocessing by referencing the past determination history.

The notification unit 114 notifies the preprocessing module 120 of the result of the determination performed by the determination unit 113. For example, the notification unit 114 notifies the preprocessing module 120 of whether or not preprocessing is required, the content of the required preprocessing, and whether or not the required preprocessing has been performed immediately previously, together with the ID assigned to the second metadata 13.

2-4-2. Output Management Module

Figure 12:
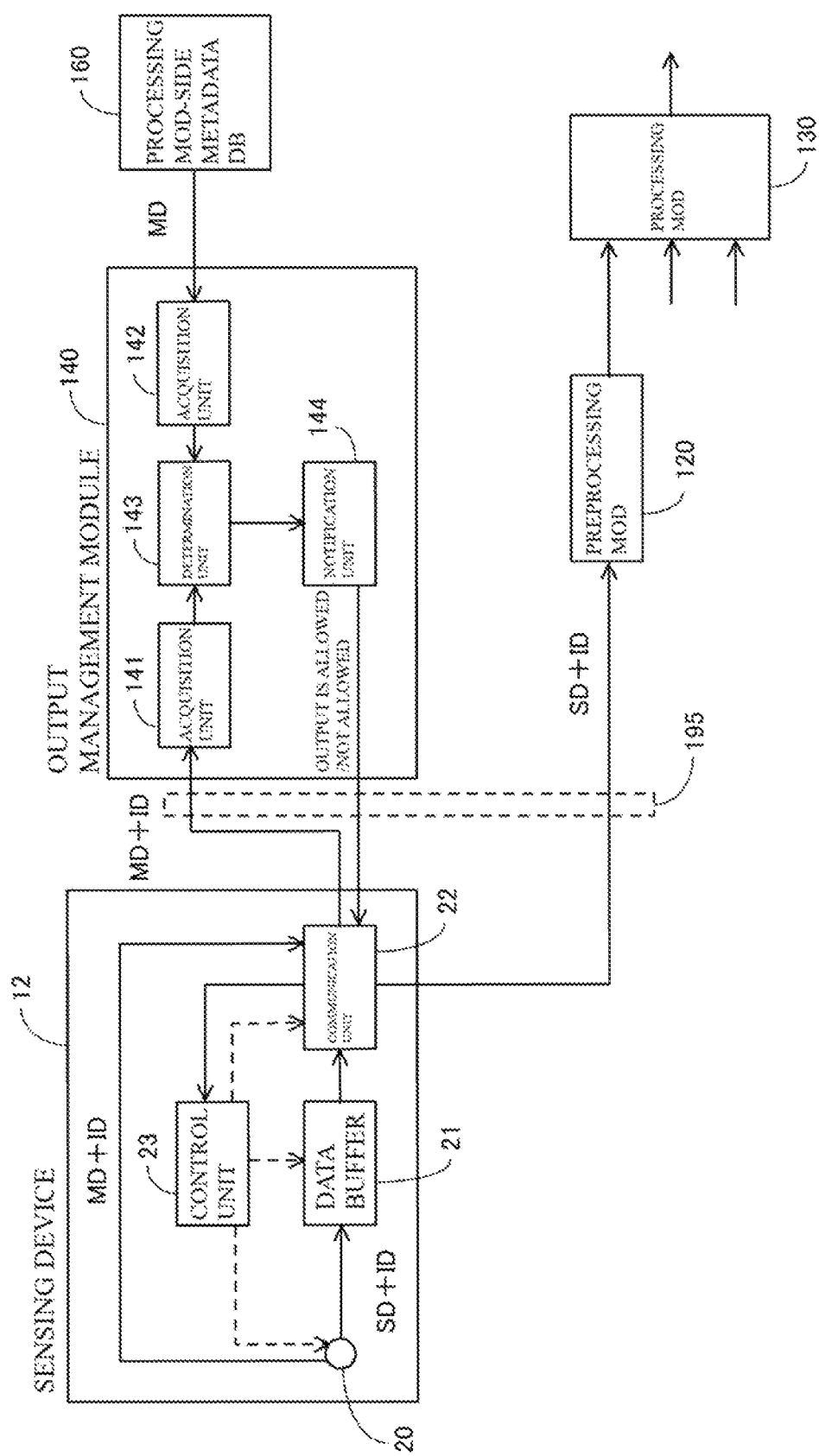
FIG. 12 is a diagram showing an example of a detailed configuration of an output management module.

FIG. 12 is a diagram showing an example of a detailed configuration of the output management module 140. In the example in FIG. 12, the output management module 140 includes acquisition units 141 and 142, a determination unit 143, and a notification unit 144. The acquisition unit 141 acquires (receives) the second metadata 13 and the ID assigned to the second metadata 13 from the sensing device 12 via the communication I/F 195. The acquisition unit 142 acquires the first metadata 161 associated with the input port from the first metadata DB 160.

The determination unit 143 determines whether or not sensing data is allowed to be output by the sensing device 12, based on the second metadata 13 acquired by the acquisition unit 141 and the first metadata 161 acquired by the acquisition unit 142. For example, the determination unit 143 determines that sensing data is allowed to be output if the sensor attributes indicated by the second metadata 13 satisfy the sensor conditions indicated by the first metadata 161, and determines that sensing data cannot be output if the sensor attributes indicated by the second metadata 13 do not satisfy the sensor conditions indicated by the first metadata 161. That is to say, if the sensing data does not satisfy the conditions of the input data of the processing module 130 even if preprocessing is performed, the determination unit 143 determines that sensing data cannot be output by the sensing device 12.

The notification unit 144 transmits information regarding whether or not output is allowed, i.e. information indicating the result of the determination performed by the determination unit 143, together with the ID assigned to the second metadata 13, to the sensing device 12 via the communication I/F 195.

Upon the sensing device 12 receiving, via the communication unit 22, the information regarding whether or not output is allowed, the control unit 23 controls output of the sensing data stored in the data buffer 21, in accordance with the received information regarding whether or not output is allowed. For example, if the received information regarding whether or not output is allowed indicates that "output is allowed", the control unit 23 controls the data buffer 21 and the communication unit 22 so as to transmit, to the preprocessing module 120, the sensing data that is assigned an ID corresponding to the ID received together with the information regarding whether or not output is allowed. Also, for example, if the received information regarding whether or not output is allowed indicates that "output is not allowed", the control unit 23 deletes, from the data buffer 21, sensing data that is assigned the ID corresponding to the ID received together with the information regarding whether or not output is allowed.

2-4-3. Preprocessing Module

Figure 13:
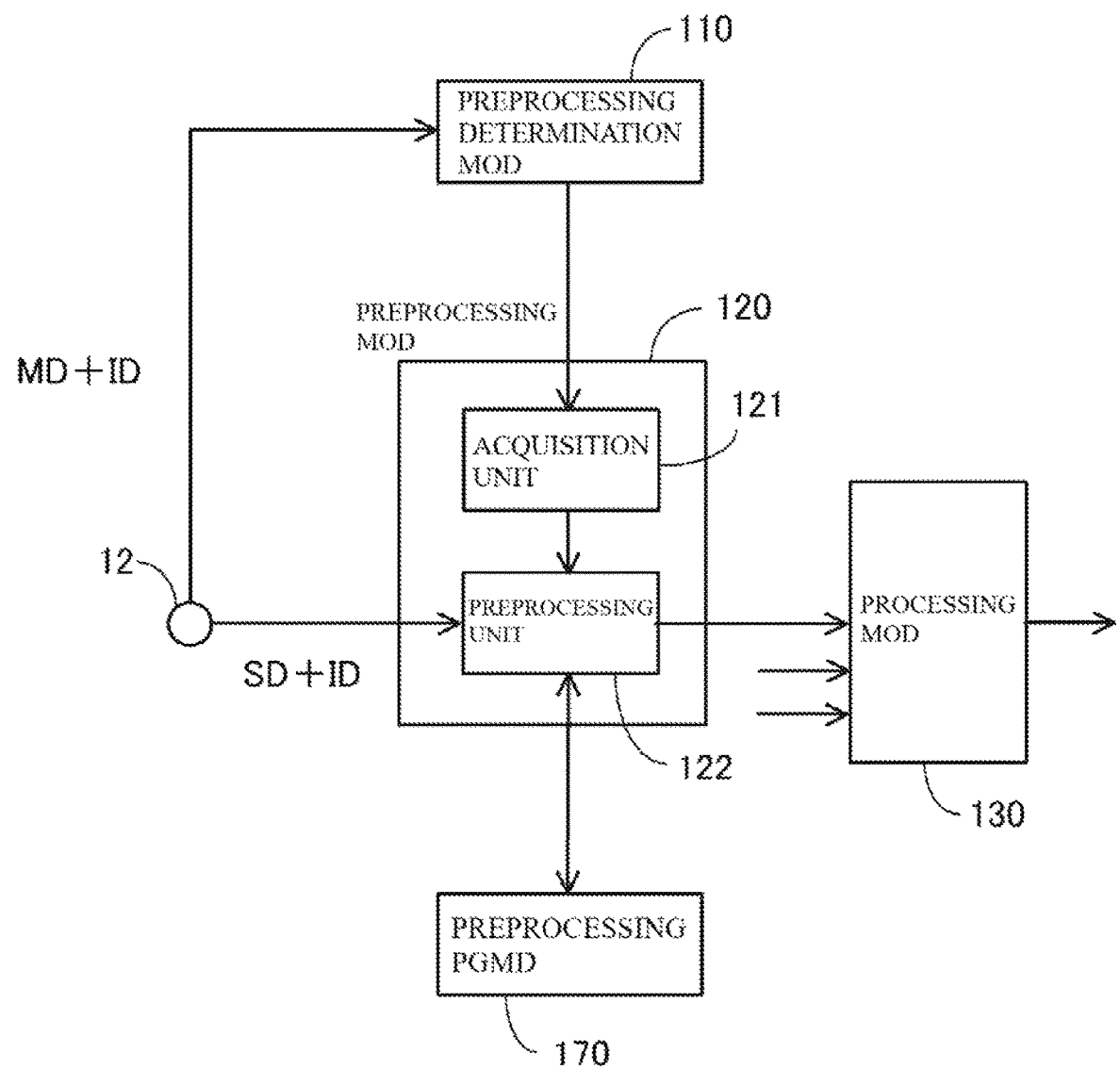
FIG. 13 is a diagram showing an example of a detailed configuration of a preprocessing module.

FIG. 13 is a diagram showing an example of a detailed configuration of the preprocessing module 120. In the example in FIG. 13, the preprocessing module 120 includes an acquisition unit 121 and a preprocessing module 122. The acquisition unit 121 acquires the result of the determination performed by the preprocessing determination module 110 and the ID assigned to the second metadata 13.

It is assumed that the determination result acquired by the acquisition unit 121 indicates that preprocessing is required, and also indicates that the required preprocessing differs from preprocessing that has been performed immediately previously. In this case, for example, the preprocessing unit 122 searches for a preprocessing program corresponding to the required preprocessing indicated by the determination result in the preprocessing program DB 170, and reads out this preprocessing program. The preprocessing unit 122 performs preprocessing on sensing data that is assigned an ID corresponding to the ID acquired by the acquisition unit 121. In the preprocessing unit 122, preprocessing that is realized due to the read preprocessing program being executed is performed on the sensing data. Then, the sensing data that has been preprocessed by the preprocessing module 120 is input to the processing module 130.

It is assumed that the determination result acquired by the acquisition unit 121 indicates that preprocessing is required, and also indicates that the required preprocessing is the same as preprocessing that has been performed immediately previously. In this case, for example, the preprocessing unit 122 does not perform the search in the preprocessing program DB 170. In the preprocessing unit 122, preprocessing that is realized due to the already-read preprocessing program being executed is performed on the sensing data. Then, the sensing data that has been preprocessed by the preprocessing module 120 is input to the processing module 130.

3. Operations 3-1. Preprocessing Determination Operation

Figure 14:
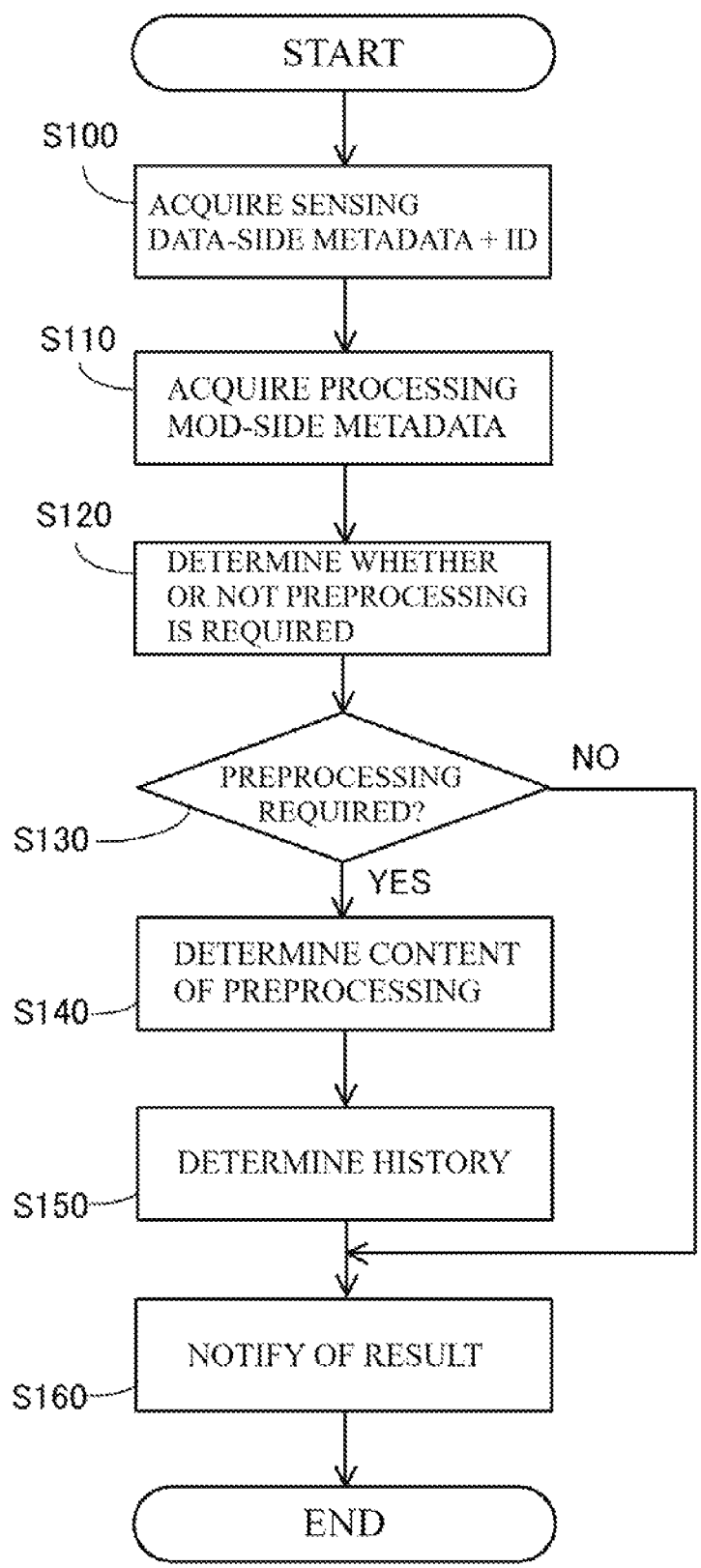
FIG. 14 is a flowchart illustrating an example of a preprocessing determination operation.

FIG. 14 is a flowchart illustrating an example of a preprocessing determination operation. The processing illustrated in this flowchart is performed by the control unit 180 operating as the preprocessing determination module 110 at a timing at which the second metadata 13 is received from the sensing device 12, for example. Note that, although the determination regarding preprocessing is performed for each of the input ports of the processing modules 130 as mentioned above, a description will be given here while paying attention to one input port of one processing module 130.

Referring to FIG. 14, the control unit 180 acquires the second metadata 13 and the ID assigned to the second metadata from the sensing device 12 (step S100). The control unit 180 acquires the first metadata 161 associated with the input port from the first metadata DB 160 (step S110). The control unit 180 determines whether or not preprocessing needs to be performed on sensing data that is assigned an ID corresponding to the ID assigned to the second metadata, based on the first metadata 161 and the second metadata 13 (step S120). The control unit 180 determines whether or not it has been determined that preprocessing is required (step S130).

If it is determined that preprocessing is not required (NO in step S130), the preprocessing determination module 110 (the control unit 180) notifies the preprocessing module 120 that preprocessing is not required, together with the ID assigned to the second metadata 13 (step S160).

On the other hand, if it is determined that preprocessing is required (YES in step S130), the control unit 180 determines the content of the required preprocessing (step S140). The control unit 180 determines whether or not the preprocessing that has been determined as being required is the same as preprocessing that has been performed immediately previously, by referencing the past determination history DB 150 (step S150). Then, the preprocessing determination module 110 (control unit 180) notifies the preprocessing module 120 of the determination result, together with the ID assigned to the second metadata 13 (step S160).

Thus, in the preprocessing determination module 110, the determination regarding preprocessing for input data to the processing module 130 is performed based on the first metadata 161 and the second metadata 13. That is to say, in the preprocessing determination module 110, the determination regarding preprocessing is performed while giving consideration to the conditions of input data in the processing module 130 and the attributes of input data that is to be input to the processing module 130. Accordingly, with the preprocessing determination module 110, consideration is given to necessary items in relation to preprocessing, and thus, the determination regarding preprocessing can be appropriately performed.

3-2. Output Management Operation

Figure 15:
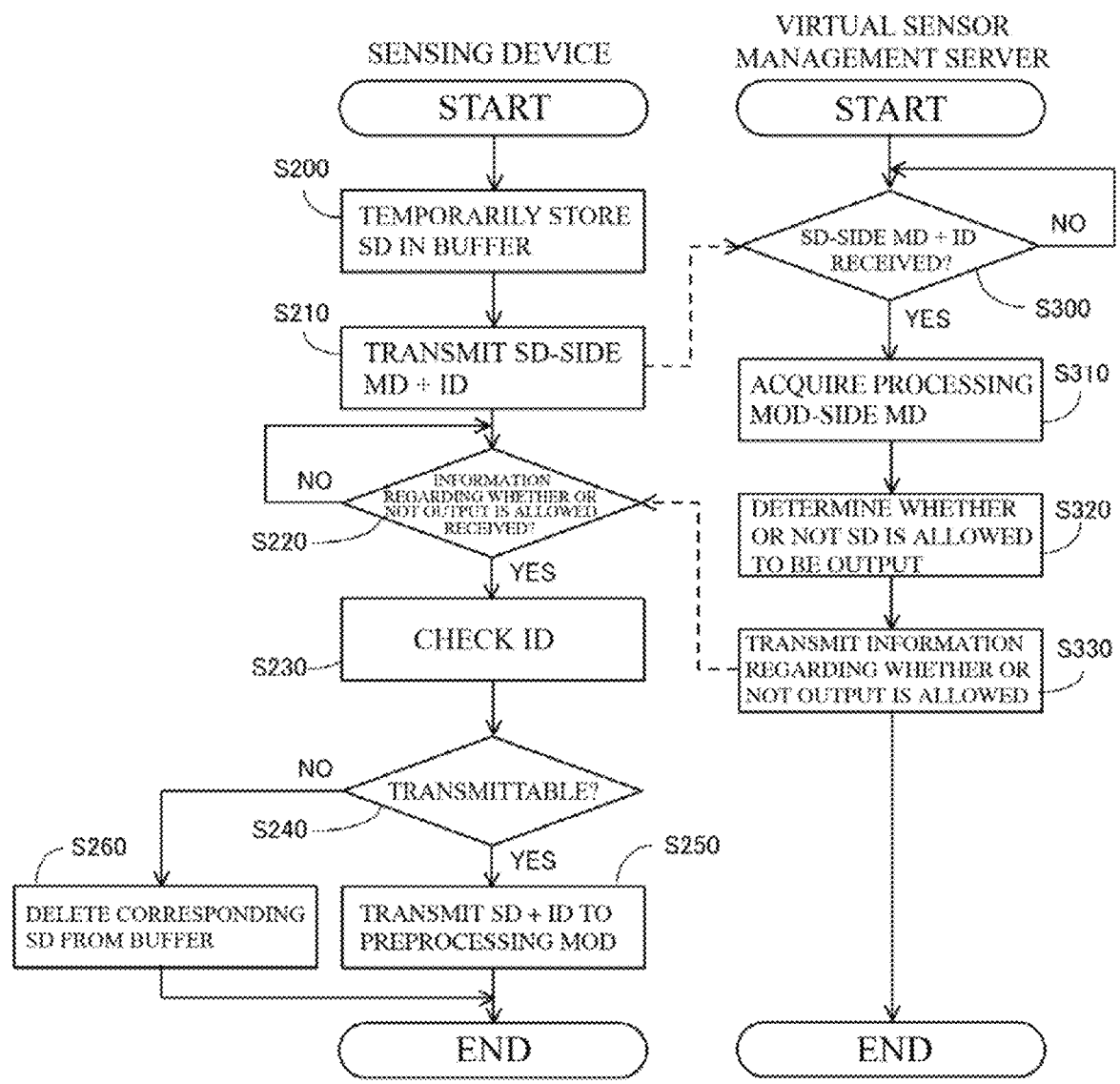
FIG. 15 shows flowcharts illustrating an example of an operation to manage output of sensing data from the sensing device to the processing module.

FIG. 15 shows flowcharts illustrating an example of an operation to manage output of sensing data from the sensing device 12 to the processing module 130. The processing indicated by these flowcharts is performed at a timing at which sensing data is generated by the sensing device 12, for example. Note that, although output management for sensing data is performed for each of the input ports of the processing modules 130 as mentioned above, a description will be given here while paying attention to one input port of one processing module 130.

Referring to FIG. 15, the left flowchart is performed by the control unit 23 (sensing device 12). Meanwhile, the right flowchart is performed by the control unit 180 (virtual sensor management server 100) operating as the output management module 140.

Referring to the left side of FIG. 15, the control unit 23 controls the data buffer 21 so as to temporarily store sensing data that is output by the real sensor 20 (FIG. 7) (step S200). The control unit 23 controls the communication unit 22 so as to transmit, to the virtual sensor management server 100, the second metadata 13 corresponding to the sensing data temporarily stored in the data buffer 21 and the ID assigned to the second metadata 13 (step S210).

Thereafter, the control unit 23 determines whether or not information regarding whether or not the sensing data is allowed to be output, or the like, has been received from the virtual sensor management server 100 (step S220). If it is determined that the information regarding whether or not output is allowed or the like has not been received (NO in step S220), the control unit 23 waits until the information regarding whether or not output is allowed or the like is received.

Referring to the right side of FIG. 15, the control unit 180 determines whether or not the second metadata 13 and the ID assigned to the second metadata 13 have been received (step S300). If it is determined that the aforementioned data have not been received (NO in step S300), the control unit 180 waits until the data are received.

If it is determined that the data have been received (YES in step S300), the control unit 180 acquires the first metadata 161 associated with the input port of the processing module 130 from the first metadata DB 160 (step S310). The control unit 180 determines whether or not sensing data associated with the second metadata 13 is allowed to be output from the sensing device 12 to the processing module 130, based on the first metadata 161 and the second metadata 13 (step S320). The control unit 180 controls the communication I/F 195 so as to transmit, to the sensing device 12, information regarding whether or not output is allowed, i.e. information indicating the determination result in step S320 together with the ID assigned to the second metadata 13 (step S330).

Referring again to the left side of FIG. 15, if it is determined in step S220 that the information regarding whether or not output is allowed and the ID have been received (YES in step S220), the control unit 23 specifies target sensing data, of the sensing data that is temporarily stored in the data buffer 21, by checking the ID (step S230).

The control unit 23 determines whether or the specified sensing data is allowed to be output (transmitted), by referencing the information regarding whether or not output is allowed (step S240). If it is determined that the specified sensing data is allowed to be transmitted (YES in step S240), the control unit 23 controls the communication unit 22 so as to transmit the target sensing data and the ID assigned to this sensing data to the preprocessing module 120 (virtual sensor management server 100) (step S250). On the other hand, if it is determined that the specified sensing data cannot be transmitted (NO in step S240), the control unit 23 performs processing to delete the target sensing data from the data buffer 21 (step S260).

Thus, in the output management module 140, the sensing device 12 is notified of whether or not sensing data is allowed to be output to the processing module 130 based on the first metadata 161 and the second metadata 13. That is to say, the sensing device 12 is notified of whether or not sensing data is allowed to be output with consideration given to the conditions of the input data to the processing module 130 and the attributes of the sensing data that is temporarily stored in the data buffer 21. Accordingly, with the output management module 140, the sensing device 12 is notified of the information regarding whether or not output is allowed with consideration given to necessary items, and the possibility that sensing data that does not satisfy predetermined conditions is input to the processing module 130 decreases. Thus, the possibility that the processing module 130 performs inappropriate processing can be reduced.

Also, in the output management module 140, the sensing device 12 is notified of information regarding whether or not output is allowed, together with the ID assigned to the second metadata 13. Accordingly, with the output management module 140, the sensing device 12 can be caused to recognize whether or not each sensing data is allowed to be output by causing the sensing device 12 to reference the ID.

3-3. Preprocessing Operation

Figure 16:
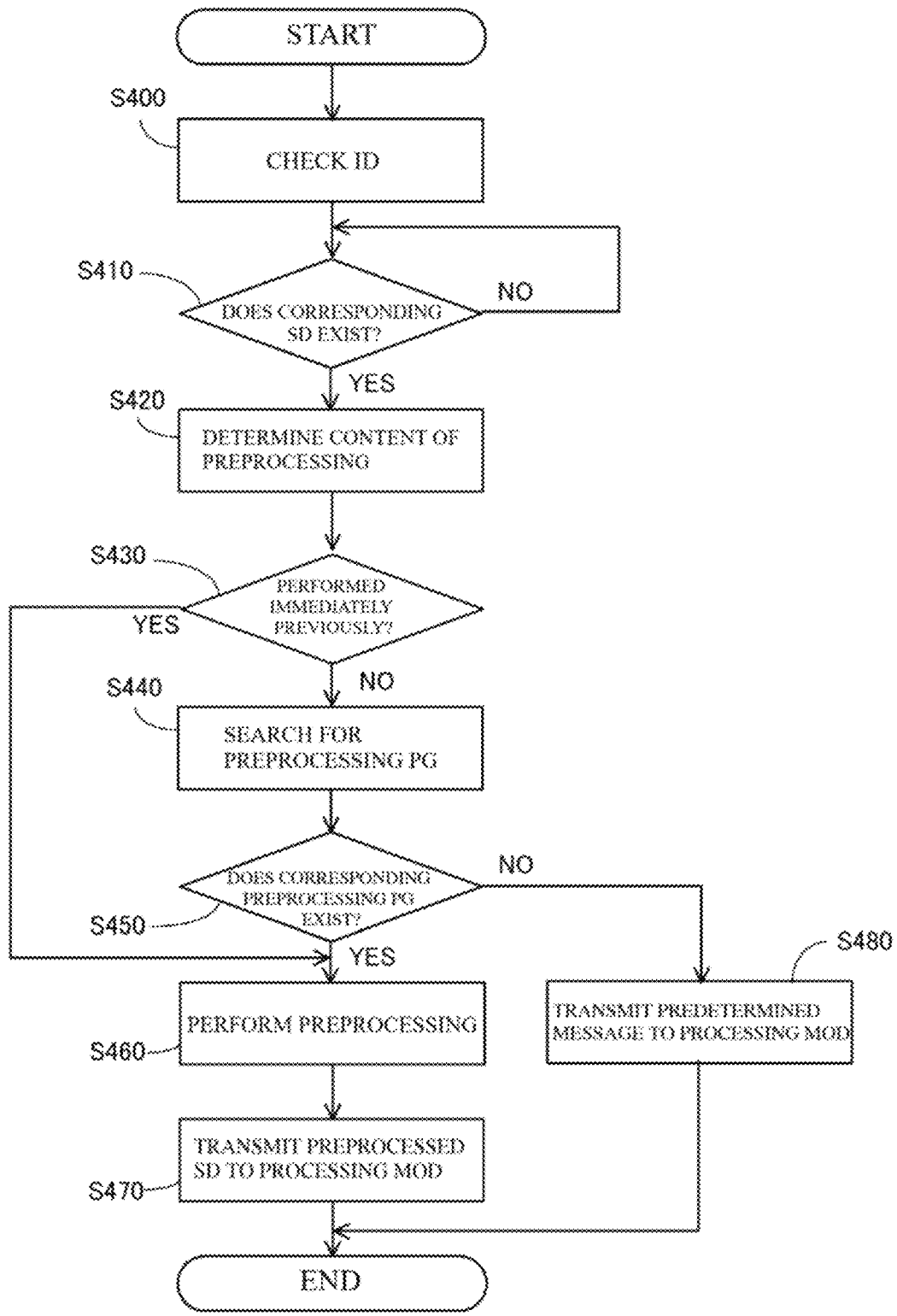
FIG. 16 is a flowchart illustrating an example of a preprocessing operation.

FIG. 16 is a flowchart illustrating an example of a preprocessing operation. The processing illustrated by this flowchart is performed by the control unit 180 operating as the preprocessing module 120 at a timing at which a notification of the determination result and the ID (the ID assigned to the second metadata 13) is given from the preprocessing determination module 110. Note that, although preprocessing for the sensing data is performed for each of the input ports of the processing modules 130 as mentioned above, a description will be given here while paying attention to one input port of one processing module 130.

Referring to FIG. 16, the control unit 180 checks the ID assigned to sensing data received from the sensing device 12 against the ID a notification of which has been given from the preprocessing determination module 110 (step S400). The control unit 180 determines whether or not sensing data has been received that is assigned an ID corresponding to the ID a notification of which has been given from the preprocessing determination module 110 (step S410).

If it is determined that sensing data has not been received that is assigned an ID corresponding to the ID a notification of which has been given from the preprocessing determination module 110 (NO in step S410), the control unit 180 waits until this sensing data is received. On the other hand, if it is determined that sensing data has been received that is assigned an ID corresponding to the ID a notification of which has been given from the preprocessing determination module 110 (YES in step S410), the control unit 180 determines preprocessing required for the target sensing data by referencing the determination result acquired from the preprocessing determination module 110 (step S420).

The control unit 180 further determines whether or not the required preprocessing is the same as preprocessing that has been performed on the sensing data immediately previously, by referencing the determination result acquired from the preprocessing determination module 110 (step S430).

If it is determined that the required preprocessing differs from preprocessing that has been performed on the sensing data immediately previously (NO in step S430), the control unit 180 searches for a required preprocessing program in the preprocessing program DB 170 (step S440). Then, the control unit 180 determines whether or not the required preprocessing program exists in the preprocessing program DB 170 (step S450). If it is determined that the required preprocessing program exists in the preprocessing program DB 170 (YES in step S450), the control unit 180 reads out this preprocessing program and performs preprocessing on the target sensing data by executing the read preprocessing program (step S460). Then, the preprocessing module 120 (control unit 180) transmits the preprocessed sensing data to the processing module 130 (step S470).

If it is determined in step S430 that the required preprocessing program is the same as preprocessing that has been performed on the sensing data immediately previously (YES in step S430), the control unit 180 performs preprocessing on the target sensing data by executing the already-read preprocessing program (step S460).

Also, if it is determined in step S450 that the required preprocessing program does not exist in the preprocessing program DB 170 (NO in step S450), the preprocessing module 120 (control unit 180) transmits a predetermined message together with the sensing data that has not been subjected to preprocessing to the processing module 130 (step S480). The predetermined message is, for example, a message indicating that the required preprocessing program does not exist.

Thus, in the preprocessing module 120, preprocessing is performed on sensing data in accordance with the result of the determination performed by the preprocessing determination module 110. That is to say, in the preprocessing module 120, preprocessing is performed on input data while giving consideration to the conditions of input data in the processing module 130 and the attributes of the input data (sensing data) that is to be input to the processing module 130. Accordingly, with the preprocessing module 120, appropriate preprocessing is performed on input data to the processing module 130, and thus, the possibility that inappropriate data is input to the processing module 130 can be reduced.

In addition, sensing data and the second metadata 13 are associated with each other via their IDs. In the preprocessing determination, the determination regarding preprocessing is performed for each input data by giving consideration to the IDs. With the preprocessing module 120, appropriate preprocessing can be performed on each piece of input data based on the result of this determination.

4. Features

As described above, in the output management apparatus (module) 140 according to the present embodiment, the sensing device 12 is notified of whether or not sensing data is allowed to be output to the processing module 130 based on the first metadata 161 and the second metadata 13. That is to say, the sensing device 12 is notified of whether or not sensing data is allowed to be output with consideration given to the conditions of input data to the processing module 130 and the attributes of the sensing data that is temporarily stored in the data buffer 21. Accordingly, with the output management apparatus 140, the sensing device 12 is notified of information regarding whether or not output is allowed with consideration given to necessary items, and the possibility that sensing data that does not satisfy predetermined conditions is input to the processing module 130 decreases. Thus, the possibility that the processing module 130 performs inappropriate processing can be reduced.

Note that the sensing device 12 is an example of a "device" of the present invention, the processing module 130 is an example of a "processing module" of the present invention, and the output management module 140 is an example of an "output management apparatus" of the present invention. The first metadata 161 is an example of "first metadata" of the present invention, and the second metadata 13 is an example of "second metadata" of the present invention. The acquisition unit 142 is an example of a "first acquisition unit" of the present invention, the acquisition unit 141 is an example of a "second acquisition unit" of the present invention, and the notification unit 144 is an example of a "notification unit" of the present invention. The communication unit 22 is an example of a "first transmission unit" of the present invention, the data buffer 21 is an example of a "data buffer" of the present invention, and the communication unit 22 is an example of a "second transmission unit" of the present invention.

5. Modifications

Although an embodiment has been described above, the present invention is not limited to the above embodiment, and various modifications may be made without departing from the gist of the present invention. Modification will be described below. However, the following modifications may be combined as appropriate.

5-1

In the above embodiment, each of the input ports of the processing modules 130 accepts input of sensing data from any of the sensing devices 12. However, the constituent elements that mainly output data to each input ports need not necessarily be the sensing devices 12. The constituent element that mainly output data to each input port may alternatively be a storage in which a data set is stored, or may be a virtual sensor, for example. Note that a data set is a set of a plurality of pieces of pre-generated data. For example, a set of sensing data that is obtained by observing an object in advance in a predetermined period is an example of a data set. Since the constituent elements that mainly output data to each input data need not necessarily be the sensing devices 12, input data to the processing modules 130 need not necessarily be sensing data. For example, input data may be purchase history data of each use in a shopping site, score data of each user in a gaming site, or the like.

5-2

In the above embodiment, the processing performed by the virtual sensor management server 100 may alternatively be realized by a plurality of servers or the like.

5-3

The second metadata 13 does not necessarily be associated with each piece of sensing data. For example, one piece of second metadata 13 may be associated with a plurality of pieces of sensing data. In this case, each of the plurality of pieces of sensing data associated with the same second metadata 13 will be subjected to the same preprocessing.

INDEX TO THE REFERENCE NUMERALS

10 . . . Sensor network system, 11 . . . Sensor network adapter, 12 . . . Sensing device, 13 . . . Sensing data-side metadata (second metadata), 14 . . . Sensor network unit, 15 . . . Internet, 20 . . . Real sensor, 21 . . . Data buffer, 22 . . . Communication unit, 23, 180 . . . Control unit, 100 . . . Virtual sensor management server, 110 . . . Preprocessing determination module, 111, 112, 121, 141, 142 . . . Acquisition unit, 113, 143 . . . Determination unit, 114, 144 . . . Notification unit, 120 . . . Preprocessing module, 122 . . . Preprocessing unit, 130 . . . Processing module, 140 . . . Output management module, 150 . . . Past determination history DB, 160 . . . Processing module-side metadata (first metadata) DB, 161 . . . Processing module-side metadata (first metadata), 170 . . . Preprocessing program DB, 182 . . . CPU, 184 . . . RAM, 186 . . . ROM, 190 . . . Storing unit, 191 . . . Control program, 195 . . . Communication I/F, 197 . . . Bus, 300 . . . Application server

The invention claimed is:

1. An output management apparatus having a control unit comprising a processor configured with a control program to perform operations comprising operation as a processing module, the output management apparatus configured to manage output of input data to the processing module by a device, operation as the processing module generating output data that differs from the input data, based on at least one piece of the input data, operation as the processing module being associated with first metadata indicating a condition of the input data for processing by the processing module, and the input data being associated with second metadata indicating an attribute of the input data, wherein the processor is configured with the control program to perform operations further comprising:
operation as a first acquisition unit configured to acquire the first metadata;
operation as a second acquisition unit configured to acquire the second metadata; and
operation as a notification unit configured to notify the device of whether the input data is caused to be output to the processing module based on the first and second metadata depending on whether the attribute of the input data indicated by the second metadata satisfies the condition of the input data indicated by the first metadata.

2. The output management apparatus according to claim 1,
wherein the device comprises:
a first transmission unit configured to transmit the second metadata to the output management apparatus;
a data buffer configured to temporarily store the input data associated with the second metadata transmitted by the first transmission unit; and
a second transmission unit configured to transmit the input data stored in the data buffer to the processing module, in accordance with whether the input data is caused to be output to the processing module.

3. The output management apparatus according to claim 2, wherein
the input data and the second metadata are associated with each other by assigning respective IDs (identifications) to the input data and the second metadata,
the first transmission unit is configured to transmit the ID assigned to the second metadata, together with the second metadata, to the output management apparatus, and
the processor is configured with the control program to perform operations such that operation as the notification unit comprises notifying the device of whether the input data is caused to be output to the processing module based on the first and second metadata, together with the ID assigned to the second metadata.

4. The output management apparatus according to claim 1,
wherein the processor is configured with the control program to perform operations such that operation as the processing module comprises generating the output data based on a plurality of pieces of the input data.

5. The output management apparatus according to claim 1,
wherein the processor is configured with the control program to perform operations such that operation as the processing module comprises switching the device to output the input data to the processing module.

6. The output management apparatus according to claim 1,
wherein the device comprises a sensor, and
the input data comprises sensing data generated by the sensor.

7. The output management apparatus according to claim 2,
wherein the processor is configured with the control program to perform operations such that operation as the processing module comprises generating the output data based on a plurality of pieces of the input data.

8. The output management apparatus according to claim 1,
wherein the processor configured with the control program to perform operations as the processing module and the device that outputs the input data to the processing module form a virtual sensor.

9. An output management method for managing output of input data to a processing module by a device, the processing module being configured to generate output data that differs from the input data, based on at least one piece of the input data, the processing module being associated with first metadata indicating a condition of the input data for processing by the processing module, and the input data being associated with second metadata indicating an attribute of the input data, the output management method comprising:
acquiring the first metadata;
acquiring the second metadata; and
notifying the device of whether the input data is caused to be output to the processing module based on the first and second metadata depending on whether the attribute of the input data indicated by the second metadata satisfies the condition of the input data indicated by the first metadata.

10. A non-transitory computer-readable storage medium storing a program for causing a computer to perform processing for managing output of input data to a processing module by a device, the processing module being configured to generate output data that differs from the input data, based on at least one piece of the input data, the processing module being associated with first metadata indicating a condition of the input data for processing by the processing module, and the input data being associated with second metadata indicating an attribute of the input data, the program, which when read and executed, causes the computer to perform operations comprising:

acquiring the first metadata;
acquiring the second metadata; and
notifying the device of whether the input data is caused to be output to the processing module based on the first and second metadata depending on whether the attribute of the input data indicated by the second metadata satisfies the condition of the input data indicated by the first metadata.

11. The output management apparatus according to claim 2, wherein the processor is configured with the control program to perform operations such that operation as the processing module comprises switching the device to output the input data to the processing module.

12. The output management apparatus according to claim 2, wherein the device comprises a sensor, and
the input data comprises sensing data generated by the sensor.

13. The output management apparatus according to claim 2, wherein the processor configured with the control program to perform operations as the processing module and the device that outputs the input data to the processing module form a virtual sensor.

14. The output management apparatus according to claim 3, wherein the processor is configured with the control program to perform operations such that operation as the processing module comprises generating the output data based on a plurality of pieces of the input data.

15. The output management apparatus according to claim 3, wherein the processor is configured with the control program to perform operations such that operation as the processing module comprises switching the device to output the input data to the processing module.

16. The output management apparatus according to claim 3, wherein the device comprises a sensor, and
the input data comprises sensing data generated by the sensor.

17. The output management apparatus according to claim 3, wherein the processor configured with the control program to perform operations as the processing module and the device that outputs the input data to the processing module form a virtual sensor.

* * * * *